United States Patent [19]

Pinnavaia et al.

[11] Patent Number: 4,665,045
[45] Date of Patent: * May 12, 1987

[54] PILLARED AND DELAMINATED CLAYS CONTAINING CHROMIUM

[75] Inventors: Thomas J. Pinnavaia, East Lansing, Mich.; Ming S. Tzou, Evanston, Ill.; Steven D. Landau, Cincinnati, Ohio

[73] Assignee: Michigan State University, East Lansing, Mich.

[*] Notice: The portion of the term of this patent subsequent to Dec. 16, 2003 has been disclaimed.

[21] Appl. No.: 723,803

[22] Filed: Apr. 16, 1985

Related U.S. Application Data

[63] Continuation-in-part of Ser. No. 641,912, Aug. 17, 1984, Pat. No. 4,129,712.

[51] Int. Cl.$^4$ .............................................. B01J 21/16
[52] U.S. Cl. ..................................................... 502/84
[58] Field of Search .............................. 502/60, 80, 84

[56] References Cited

U.S. PATENT DOCUMENTS

| | | | |
|---|---|---|---|
| 4,452,910 | 6/1984 | Hopkins et al. | 502/84 |
| 4,510,257 | 4/1985 | Lewis et al. | 502/63 |
| 4,515,901 | 5/1985 | Elattar | 502/63 |

*Primary Examiner*—Carl F. Dees
*Attorney, Agent, or Firm*—Stefan J. Klauber

[57] ABSTRACT

A process for preparing a pillared layered lattice clay, comprising the steps of preparing a hydrolyzed solution of chromium ion by reacting a solution of a salt of the said metal with a base at temperatures above 60° C., aging the solution at or above the said temperatures to develop the hydrolyzed pillaring agent, and contacting an aqueous slurry of a smectite, vermiculite, or flurohectorite with the hydrolyzed solution, and recovering the intercalated pillared clay product. The resultant products have unit cells containing from 1.2 to 4.2 chromium ions per cell, and have a repeating spacing of from about 18 to 28 Angstroms. The products are uniquely active catalysts for numerous applications, e.g., in the petrochemical industry.

18 Claims, 4 Drawing Figures

XRD PATTERNS (CuK$_\alpha$) OF MONTMORILLONITE PILLARED BY POLYOXYCHROMIUM

XRD PATTERNS (CuK$_\alpha$) OF AIR-DRIED (AD) AND FREEZE-DRIED (FD) SAMPLES OF SYNTHETIC HECTORITE (LAPONITE RD) WHICH HAS BEEN SUBSTANTIALLY DELAMINATED BY REACTION WITH POLYOXYCHROMIUM.

CONVERSION OF CYCLOHEXANE TO BENZENE AT 550° C. CURVES LABELED $Cr_{1.2}$ AND $Cr_{3.5}$ ARE FOR PILLARED MONTMORILLONITES OF THE PRESENT INVENTION. THE CURVE LABELED $Cr_{1.9}$ IS FOR A MONTMORILLONITE PREPARED BY THE PRIOR ART OF BRINDLEY AND YAMANAKA.

UPTAKE OF CYCLOHEXANE VERSUS $(time)^{1/2}$ AT 25° AND $P/P_0 = 1.0$ BY CHROMIUM MONTMORILLONITES AFTER BEING USED FOR 2 HOURS ON-STREAM FOR CYCLOHEXANE DEHYDROGENATION TO BENZENE.

PILLARED AND DELAMINATED CLAYS CONTAINING CHROMIUM

RELATED APPLICATION

This application is a continuation-in-part of application Ser. No. 641,912, filed Aug. 17, 1984 U.S. Pat. No. 4,129,712 and entitled "Delaminated Clay Materials."

FIELD OF THE INVENTION

This invention relates generally to layered lattice silicates, and more specifically relates to pillared and to delaminated layered lattice silicates, such as clays of this type belonging to the smectite group.

BACKGROUND OF THE INVENTION

Naturally occurring and synthetic smectite clays such as bentonite, montmorillonite, hectorite, fluorohectorite, saponite, beidellite, nontronite, and related analogs, are generally comprised of layers which can be visualized as a sandwich or platelet containing two outer sheets of silica tetrahedra and an inner or central octahedral sheet of a hydrous metal oxide, such as alumina or magnesia octahedra. These platelets are stacked one upon the other to yield a clay particle. Normally, this arrangement yields a repeating structure ($d_{001}$) about every ten Angstroms to give a material with relatively low surface areas.

The alkali metal and alkaline earth metal ions in ordinary smectite clays can be replaced by ion exchange with polyoxymetal cations. Polyoxycations in the size range of from about 4 to 10 Angstroms function as molecular props or "pillars", and serve to keep the clay layers separated in the absence of a swelling solvent. Thus, whereas the layers of an ordinary smectite collapse in van der Waals contact when heated to elevated temperatures to give a material with low surface area (approximately 10–30 $m^2/g$), smectites pillared by polyoxycations can exhibit $d_{001}$ distances in the 14.5 to 20 Angstrom range at temperatures to 500° C., as well as surface areas in the range of from 200 to 400 square meters per gram.

General background respecting pillared clay products and processes for producing same can be found in a number of issued United States patents, including among others, U.S. Pat. Nos. 4,271,043 and 4,248,739 to Vaughan et al, which relates to methods for preparing pillared interlayered clays by reacting a smectite type clay such as a bentonite with high molecular weight cationic metal complexes, such as those of aluminum, zirconium or titanium.

Similarly, U.S. Pat. No. 4,216,188 to Shabria et al discloses preparation of a montmorillonite which is cross-linked with aluminum hydroxide or with chromium hydroxide.

U.S. Pat. No. 4,410,751 to Shin et al in part discloses a catalyst comprised of a smectite such as a montmorillonite, having zirconium oxide intercalated to form pillars between sheets of $S_iO_4$ tetrahedra of adjacent aluminosilicate layers.

Of particular interest in relation to pillared interlayered clays of the type heretofore discussed, are those in which chromium-based complexes are interlayered—this in view of the fact that oxides of chromium in catalysts are known to demonstrate high catalytic activities.

In the aforementioned Shabria et al, U.S. Pat. No. 4,216,188, chromium hydroxide is thus disclosed as a pillaring agent. The hydroxide treating solution in Shabria is prepared and aged at room temperatures; and the resultant pillared clay samples, even without being subjected to high temperature heatings, have repeating ($d_{001}$) spacings of the order of about 18 Angstroms. Specific surface areas are in the range of about 160 to 240 $m^2/g$, which is relatively low.

Further to be noted is that G. W. Brindley and S. Yamanaka, Amer. Mineral., 64, 830–835 (1979) have reported a chromium interlayered montmorillonite. This product had $d_{001} = 17.7$ A at 25° and 16.5 A at 200°, contained 1.88 Cr/unit cell, and exhibited a surface area of 280 $m^2/g$ when dehydrated in air at 200° C.

In U.S. Pat. No. 4,452,910 to Hopkins et al expanded layer smectites having a regular pore structure and suitable for catalytic uses, are prepared by a process wherein the clay is treated with a chromium-oligomer solution and subjected to a stabilization heat treatment in an inert gas atmosphere. The chromium-oligomer solutions in Hopkins et al are prepared at room temperatures, and aged at such temperatures. The resultant pillared clay products have repeating spacings $d_{001}$ of the order of 15 Angstroms or less, and surface area of from 44 to 305 square meters per gram, where the treated smectite is a bentonite.

Of additional relevance to this invention is our copending application Ser. No. 641,912 filed Aug. 17, 1984, wherein we have disclosed a process for preparing delaminated smectite clay compositions having bimodal pores, which facilitate diffusion of large hydrocarbon molecules. As disclosed therein, the process includes reacting a mixture of a trioctahedral smectite having an average particle size of up to about 500 Angstroms, and in general a lath-shaped morphology, with a polymeric cationic hydroxy metal complex in an aqueous medium, and recovering the reacted clay solids, preferably by freezedrying. Smectite clay compositions prepared in accordance with the said procedure have a completely or substantially completely "delaminated" structure. In particular, the predominantly edge-to-edge and edge-to-basal association of the clay layers which result yields a combination of macro- meso- and microporosity in the clay, which has high thermal stability. The product exhibits an extremely diffuse or substantially non-existent X-ray diffraction pattern.

SUMMARY OF THE INVENTION

Pursuant to the foregoing, it is an object of the present invention, to provide a process for production of a stable pillared layered lattice silicate which contains interlayered polyoxy metal aggregates based upon chromium, wherein the $d_{001}$ repeating spacing is considerably larger than has heretofore been known in the prior art, specifically being of the order of 18 to 28 Angstroms.

It is a further object of the invention, to provide new pillared clay catalysts and absorbents, which have been synthesized by binding polyoxycations of chromium in the interlayers of naturally occurring and synthetic 2:1 layered silicate minerals of the swelling type (i.e. smectites, fluorohectorites, hydromicas and vermiculites), which products have unit cells containing from 1.2 to 4.2 chromium ions per unit cell, and which have a repeating spacing of from 18 to 28 Angstroms.

In accordance with the process of the invention, a hydrolyzed solution of chromium ion is initially prepared by reacting a solution of the metal salt with a base at temperatures above 60° C., and thereupon aging the solution at or above said temperature to develop the hydrolyzed pillaring agent. An aqueous slurry of a layered lattice silicate selected from the group consisting of smectites, vermiculites and flurohectorite, is then contacted with the aged hydrolyzed solution, after which the intercalated pillared clay product is recovered. This pillared product can then be heated, as desired, to dehydrate same.

In forming the new pillared or delaminated clays of the present invention, a primary objective was one of forming large polyoxymetal cations in solution which would bind to the clay layers. Moreover, the cations require a method of generation with minimal formation of insoluble metal hydroxides, and a method for removing the insoluble hydroxides which co-precipitate with the flocculated clay. In the instance of polyoxychromium, and in accordance with the present invention, these objectives are attained by carrying out the hydrolysis of $Cr^{3+}$ solutions under basic conditions, and at elevated temperatures. The extent of solution hydrolysis (polyoxycation formation) is optimized and the extent of insoluble hydroxide formation minimized, by preferably using solution sodium carbonate or solid sodium carbonate as the source of the base. Most of the co-precipitated chromium hydroxide is removed from the flocculated clay by washing the products, using aqueous dispersion/centrifugation techniques.

The resultant polyoxychromium clays are uniquely active catalysts for cyclic paraffin conversion to aromatics, a process important in fuel reforming. Among other things, they are also useful for olefin isomerization and polymerization, naptha refining, ethylbenzene to styrene conversion, butane to butadiene conversion, and hydrocarbon cracking.

The salt utilized in preparing the initial chromium ion-containing solution may e.g. comprise chromium nitrate or chromium perchlorate. A 0.1 molar solution is convenient to use; but solutions containing up to the solubility limit for the salt can be used.

The source of base utilized in the process of the invention is preferably sodium carbonate. The ratio of equivalents of base to moles of chromium ion, designated hereafter as "n", is preferably in the range of from about 1.5 to 2.5. The reaction temperatures and aging temperatures are preferably in the range of from about 90° to 100° C., and more optimally around 95° C. The aging may be carried out from about 1 to 72 hours. Where the temperature is of the order of 95° C., from 1 to 3 hours is usually completely adequate.

The amount of chromium in the slurry should be at least one mole per unit cell of clay—the term "unit cell" being hereinafter defined.

Contact between the aqueous clay slurry and the hydrolyzed pillaring solution can be at temperatures between 0° C. and boiling. The product of the reaction can be recovered by centrifuging, followed by washing and air drying. In instances where the clay is of the trioctahedral smectite type and otherwise is in accord with the disclosure of co-pending application Ser. No. 641,912, e.g. a synthetic hectorite such as the LAPONITE ® product of Laporte Industries, Ltd. (U.K.), it is preferable to utilize a freeze drying technique, as opposed to air drying, in order to achieve the desired delamination which is disclosed in greater detail in the said Ser. No. 641,912 application, of which this application is a continuation-in-part.

The product resulting from this invention, thus constitutes a pillared (and in some instances delaminated) clay of the smectite group or flurohectorite or vermiculite, which is intercalated with polyoxycations of chromium, and providing a unit cell, defined as $O_{20}$ $(OH_{4-x} F_x)$ units, where x equals O to 4 depending on the type of clay, containing from about 1.2 to 4.2 chromium ions per cell, and having a repeating spacing of at least 18 Angstroms. More generally, the range of the repeating spacing is from about 18 to 28 Angstroms. The surface area of the product is at least 140 square meters per gram, and more generally can be as much as 450 or more square meters per gram.

DESCRIPTION OF PREFERRED EMBODIMENTS

Figure 1:
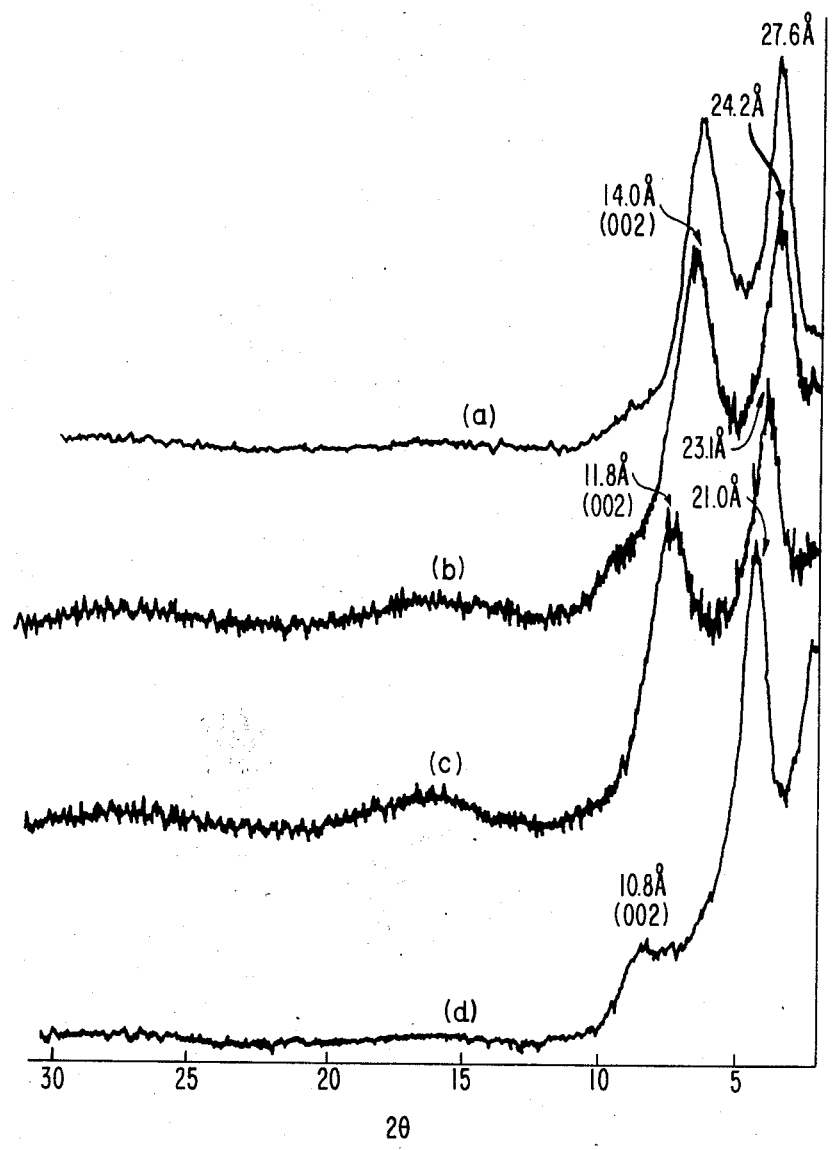
FIG. 1 is a graph depicting the X-ray diffraction (XRD) patterns for $Cr_{3.5}$-montmorillonite after being heated in argon at various temperatures.

A further understanding of the present invention can be obtained by reference to certain specific Examples which now follow, which are however provided herein for purposes of illustration only, and which are not intended to be delimitive of the invention otherwise described and claimed:

EXAMPLE I

A solution of chromium nitrate was prepared by dissolving 20.0 g (0.05 moles) of Cr $(NO_3)_3 \cdot 9H_2O$ in 300 ml of water. A second solution of 5.28 g (0.05 moles) of $Na_2(CO_3)$ in 200 ml of water was prepared, and then the carbonate solution was added dropwise to the vigorously stirred chromium solution at the rate of about 10 ml per min. The resulting solution was heated at 95° C. for 36 hr. An aqueous suspension of 1.0 g of sodium montmorillonite in 100 ml of water was added slowly to the hot hydrolyzed chromium solution. The montmorillonite had a unit cell formula of $Na_{0.60}$ $[Al_{3.13}$ $Fe_{0.42}$ $Mg_{0.47}](Si_{7.87} Al_{0.13})$ $O_{20}(OH)_4$. The clay slurry and the solution of the hot pillaring reagent were intermixed for about 1.5 hr., after which the intercalated clay product was collected by centrifuging. The product was washed by suspending in water at ambient temperature and centrifuging. The wash procedure was repeated six times and the product was air-dried. The chromium pillared montmorillonite had a chromium content of 1.24 Cr/unit cell. The product was found to have a repeating spacing $d_{001}$ of 26.8 Angstroms at 25° C., and 23.9 Angstroms after heating at 350° C. in the absence of oxygen. The BET $(N_2)$ surface area was 433 square meters per gram after dehydration in an inert atmosphere (argon or nitrogen) at 350° C. The pore size was greater than 10 Angstroms as evidenced by adsorption of perflurotributylamine (0.43 mmol per gram of the pillared clay).

EXAMPLE II

In this Example, the treating (i.e. pillaring) solution was prepared by intermixing solid sodium carbonate with the chromium nitrate solution. A solution of chromium nitrate was prepared by dissolving 20.0 g (0.05 moles) of $Cr(NO_3)_3 \cdot 9H_2O$ in 500 ml of water. Anhydrous sodium carbonate in powdered form (5.28 g, 0.05 moles) was added slowly at room temperature to the chromium solution. The addition of the solid sodium carbonate was done carefully enough to prevent splashing and loss of solution due to the vigorous release of carbon dioxide gas. The resulting solution was heated at 95° C. for 35 hr. and then the solution was centrifuged once to remove a small amount of chromium hydroxide precipitate. As in Example I, a suspension of 1.0 g of the aforementioned sodium montmorillonite in 100 ml of water was intermixed with the hot hydrolyzed pillaring reagent for a period of about 1.5 hr. The product was recovered and washed as in Example I, and it was found that the $d_{001}$ spacing at 25° C. was about 27 Angstroms. After heating to 350° C. and 500° C. in an inert atmosphere, the spacing was 23 Angstroms and 21 Angstroms, respectively.

For purposes of comparison, it is to be noted that a product prepared by the method of G. W. Brindley and S. Yamanaka in the aforementioned reference in *American Minerology*, with 1.88 Cr/per unit cell, gave a $d_{001}$ value of 17.7 Angstroms at 25° C. and 13.7 Angstroms at 550° C. FIG. 1 herein shows the XRD patterns for $Cr_{3.5}$-montmorillonite after being heated in argon at various temperatures. The BET (nitrogen determined) surface area of $Cr_{3.5}$-montmorillonite after activiation at 350° C. was 350 square meters per gram. A pillared montmorillonite was prepared under analogous hydrolysis conditions, except that the n value was 1.5 rather than 2.0 and this gave a BET surface area of 378 square meters per gram. The Brindley and Yamanaka material, by contrast, had a surface area of only 61 square meters per gram after 350° C. activation, in an inert atmosphere. The $Cr_{3.5}$-montmorillonite product of this invention exhibited a pore size greater than 10 Angstroms by adsorbing 0.47 mmole of perflurotributylamine per gram of pillared clay. The Brindley and Yamanaka material by contrast, had a perfluorotributylamine adsorption capacity of less than 0.04 mmole per gram of clay.

EXAMPLE III

In this Example, the hydrolysis reaction between $Cr(NO_3)_3 \cdot 9H_2O$ in aqueous solution at a concentration of 0.1 molar and sodium carbonate added in the solid form, was carried out at temperatures of 60° to 95° C. for periods ranging from 2 hours to 36 hours, and at various n values in the range 0.0 to 2.5. The resultant hydrolyzed solutions were then intermixed with sodium montmorillonite suspensions for 1.5 hr at the hydrolysis temperature of the pillaring reagent in accordance with the procedures of Example I. The resultant pillared clay products were separated and recovered in the manner described in that Example. In Table 1 herein, the $d_{001}$ spacings of the pillared products obtained under the various conditions indicated are set forth. Included in the table for comparison are the $d_{001}$ spacings for products obtained when the chromium solutions are hydrolyzed with solid sodium carbonate and aged at 25° C. and intermixed with montmorillonite at 25° in accordance with the prior art of Brindley and Yamanaka. It will be seen that the prior art of Brindley and Yamanaka provided materials with $d_{001}$ spacings of less than 18 Angstroms. Typically, the methods of the present invention afforded products with $d_{001}$ spacings of 18 to 27.6 Angstrom units.

TABLE I

Basal Spacing in Angstroms For Air-Dried Products Obtained by Reaction of $Na^+$—Montmorillonite with Hydrolyzed Chromium Solutions.

| | Aging Conditions for Hydroxy Chromium Solutions | | | | |
|---|---|---|---|---|---|
| n | 25° C. 3 weeks | 60° C. 2 hr | 95° C. 1 hr | 95° C. 6 hr | 95° C. 36 hr |
| 0.0 | — | 14.5 | 13.38 | 16.0 | 16.3 |
| 0.5 | 14.5[a] | 14.5 | 14.0 | 16.3 | 17.0 |
| 1.0 | 15.5[a] | 16.0 | 14.7 | 17.3 | 18.3 |
| 1.5 | 17.3[a] | 16.7 | 18.5 | 23.9 | 27.6 |
| 2.0 | 17.7[a] | 17.7 | 21.0 | 26.0 | 27.6 |
| 2.5 | — | 20.0 | 23.2 | 24.5 | 27.6 |

[a]These products were prepared by using the hydrolysis conditions of temperature and aging time described by the prior art of Brindley and Yamanaka.

EXAMPLE IV

In this Example, the host clay utilized was a synthetic fluorohectorite having an ion exchange capacity of about 180 milliequivalents per 100 g. A solution of $Cr(NO_3)_3 \cdot 9H_2O$ was prepared by dissolving 46.8 g (0.117 moles) of the salt in 500 ml of water. A second solution of $Na_2CO_3$ was prepared by dissolving 12.4 g (0.117 moles) in 1000 ml of water. The carbonate solution was added dropwise to the chromium solution by using vigorous stirring, and the resulting solution was aged at 95° C. for 36 hr. One gram of the synthetic fluorohectorite in 100 ml of water was added slowly to the hot, hydrolyzed chromium solution. The mixture was stirred for 1.5 hr and then the product was recovered and washed as set forth in Example I herein. It was found to have a composition of 0.52 Cr per eight silicons, or equivalently, 4.2 Cr per unit cell. Of interest, is that the chromium content was considerably higher in this particular instance than in the instance of the $Cr_{1.24}$-montmorillonite, even though the conditions used to prepare the polyoxychromium cations were the same as those used to obtain the $Cr_{1.24}$-montmorillonite. The $d_{001}$ spacings were 19.2, 17.3, and 15.8 Angstroms, respectively, after heating at 25° C., 110° C., and 350° C. under inert atmosphere (argon). The surface area was 144 square meters per gram after dehydration at 350° C. under helium.

EXAMPLE V

Figure 2:
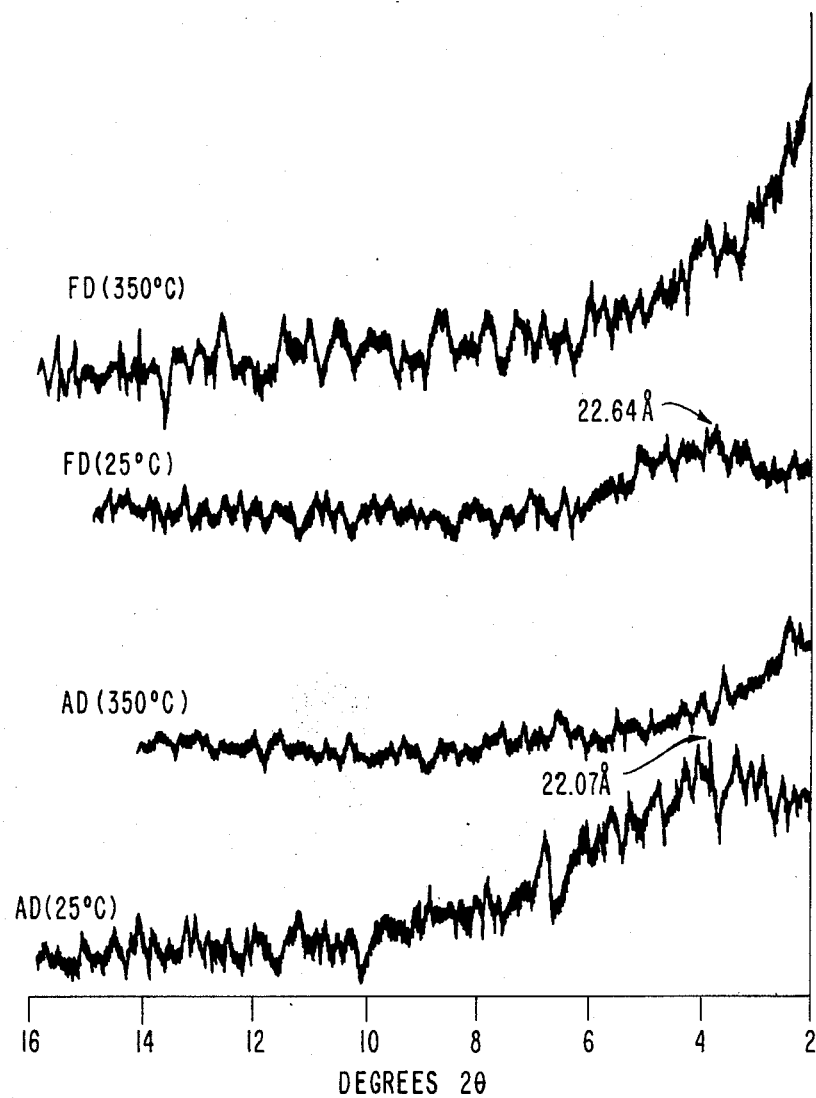
FIG. 2 is a further graph depicting an XRD for a delaminated clay obtained by reaction of a synthetic hectorite with a hydrolyzed chromium nitrate solution, both the air-dried and freeze-dried product being depicted.

In the present Example, a delaminated clay of the type disclosed in the aforementioned application, Ser. No. 641,912 was obtained by reaction of the said LAPONITE ®RD clay product. A solution of 13.8 g (0.0344 moles) $Cr(NO_3)_3 \cdot 9H_2O$ in 150 ml of water was vigorously stirred while a solution of 3.64 g (0.0343 moles) $Na_2CO_3$ in 195 ml water was added dropwise. The resulting solution was aged for 36 hr at 95° C. and then one gram of LAPONITE ® RD in 100 ml of water was added dropwise. The mixture was stirred for 1.5 hr and transferred to a dialysis membrane (VWR Scientific, Inc., 12,000–14,000 molecular weight cut-off) and dialyzed at room temperature for 8 hours. The product was recovered by either freeze-drying or by air-drying. The resultant product was found to have an XRD which was diffuse, and it was essentially amorphous for both air-dried and freeze-dried products. The resultant X-ray diffraction pattern for air-dried and freeze-dried samples are set forth in the graph of FIG. 2. The chromium content corresponded to 21.6 Cr/per unit cell. Much of this chromium was in the form of a co-precipitated hydroxide, which was retained in the sample because it was washed by dialysis, rather than by centrifugation. The surface area was 260 square meters per gram for the air-dried product, and 206 square meters per gram for the freeze-dried product. In obtaining the X-ray diffraction patterns of FIG. 2, argon was passed over the samples at 25° C. or at 350° C. for two hours prior to recording the patterns.

EXAMPLE VI

Figure 3:
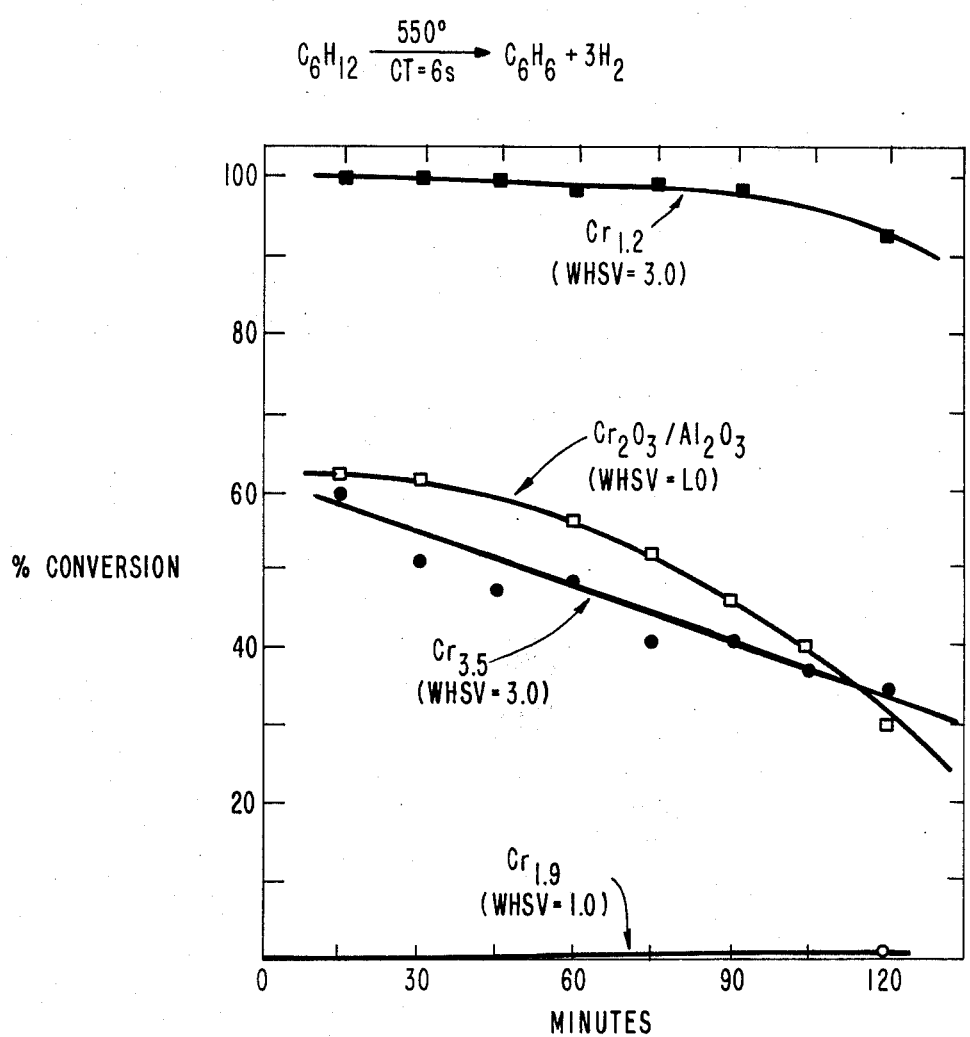
FIG. 3 is a graph comparing the catalytic activity of a pillared $Cr_{1.2}$ and $Cr_{3.5}$-montmorillonite with a $Cr_{1.9}$-montmorillonite prepared by the prior art.

In this Example, the catalytic activities of $Cr_{1.2}$-and $Cr_{3.5}$-montmorillonite, prepared by the procedures of Examples I and II were compared with $Cr_{1.9}$-montmorillonite prepared by the prior art procedure of the aforementioned Brindley and Yamanaka article. The reaction considered was the dehydrogenation of a cyclic alkane, more specifically of cyclohexane to benzene at 550° C. using a contact time (CT) of 6.0 seconds and a weight hourly space velocity (WHSV) which are indicated in the graph of FIG. 3. In this Figure, the activity of a commercial chromia on alumina catalysts is designated $Cr_2O_3/Al_2O_3$.

$Cr_{1.2}$-montmorillonite was the most active catalyst, even though it contained the least amount of chromium (8.3 weight percent). The $Cr_{3.5}$-montmorillonite (18.7 percent chromium) was comparable to the commercial catalysts $Cr_2O_3/Al_2O_3$ (13.5 weight percent chromium). The Brindley and Yamanaka material, $Cr_{1.9}$-montmorillonite (12.0 weight percent chromium) was almost completely inactive.

EXAMPLE VII

Figure 4:
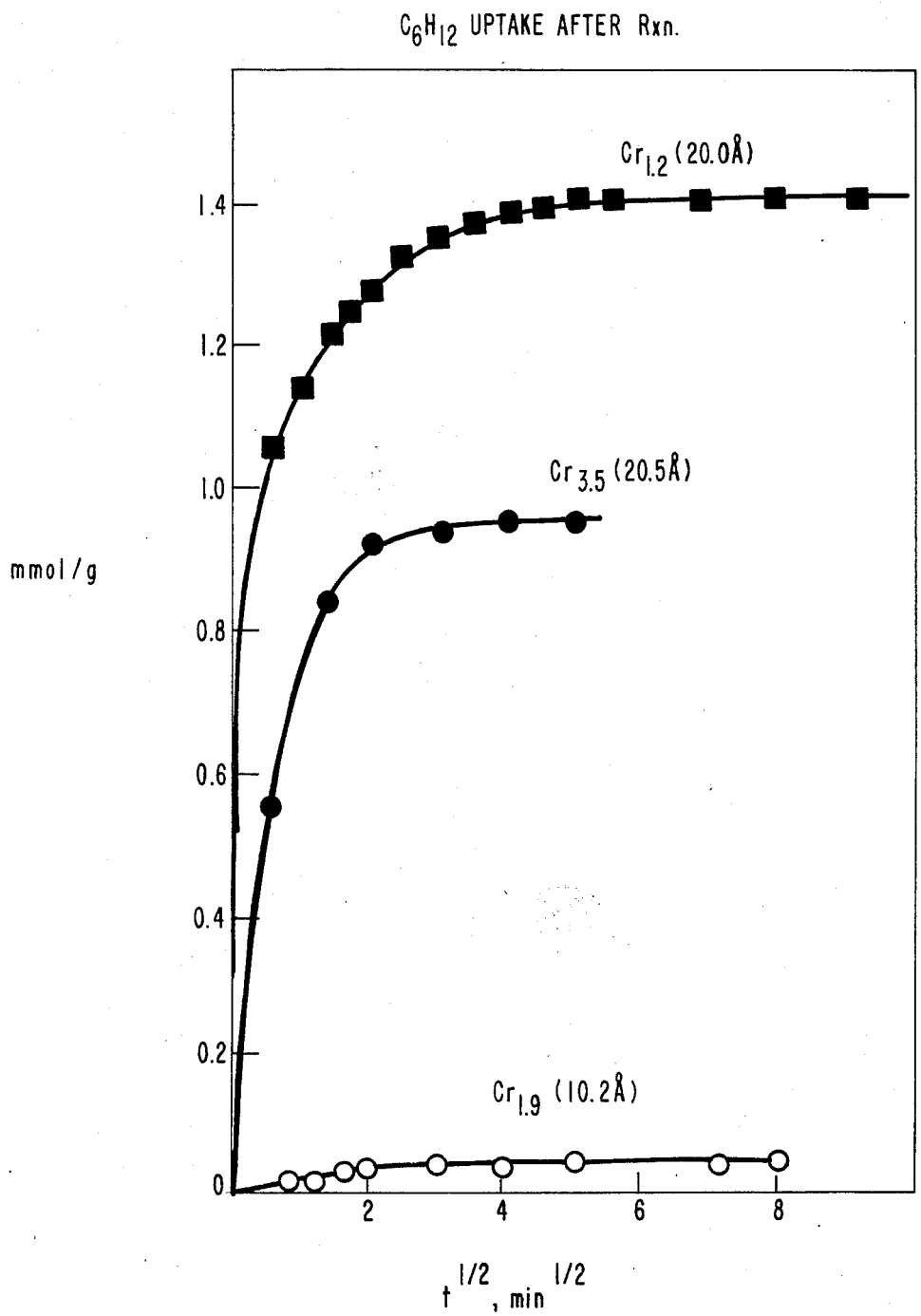
FIG. 4 is a graph showing the cyclohexane uptake curves as a function of time, for pillared montomorillonites prepared in accordance with the present invention.

The high-catalytic activity of the pillared clay products of the present invention is believed to be attributable to the high accessability of interlayer chromium centers. The accessability of chromium in this Example is demonstrated by the cyclohexane uptake curves, which appear in FIG. 4. The samples utilized were the $Cr_{1.2}$-and the $Cr_{3.5}$-montmorillonite previously prepared by the procedures of Example I. After being used for cyclohexane dehydrogenation for two hours on stream, both of these samples adsorbed cyclohexane rapidly and retained high $d_{001}$ spacings (20 to 20.5 Angstroms). In contrast, the prior art material of Brindley and Yamanaka, i.e., $Cr_{1.9}$-montmorillonite was found to fail to adsorb cyclohexane, and exhibited a low $d_{001}$ spacing (10.2 Angstroms) after two hours on stream.

The present invention has been particularly set forth in terms of specific embodiments thereof, it will be understood in view of the instant disclosure, that numerous variations upon the invention are now enabled to those skilled in the art, which variations yet reside within the scope of the instant teaching. Accordingly, the invention is to be broadly construed, and limited only by the scope and spirit of the claims now appended hereto.

We claim:

1. A process for preparing a pillared layered lattice clay, comprising the steps of:

(a) preparing a hydrolyzed solution of chromium ion by reacting a solution of a salt of the said metal with a base at temperatures above 60° C., and aging the solution at or above said temperatures to develop the hydrolyzed pillaring agent;

(b) contacting an aqueous slurry of a layer lattice clay selected from the group consisting of smectites, vermiculite, and flurohectorite with said hydrolyzed solution; and (c) recovering the intercalated pillared clay product.

2. A method in accordance with claim 1, wherein said base is sodium carbonate.

3. A method in accordance with claim 2, wherein said base is in a solution which is added to a solution of said salt.

4. A method in accordance with claim 1, wherein said reaction temperatures and said aging temperatures are in the range of from about 90° to 100° C.

5. A method in accordance with claim 1, wherein the ratio of equivalents of base to moles of chromium ion is in the range of from about 1.5 to 2.5.

6. A method in accordance with claim 4, wherein said temperatures are maintained at about 95° C.

7. A method in accordance with claim 1, wherein said aging is carried out from 1 to 72 hours.

8. A method in accordance with claim 4, wherein said aging is carried out from 1 to 3 hours.

9. A method in accordance with claim 2, wherein said salt is chromium nitrate.

10. A method in accordance with claim 1, wherein said intercalated pillared product is recovered by centrifuging.

11. A method in accordance with claim 9, wherein said product recovered by centrifuging is washed and air-dried.

12. A method in accordance with claim 1, wherein said clay is a trioctahedral smectite having an average particle size of up to about 500 Angstroms and a generally lath-shaped morphology and wherein said recovered product is subjected to freeze drying.

13. A method in accordance with claim 1, wherein the amount of chromium ion in step (b), is at least one chromium ion per equivalent of a said clay in the slurry.

14. A method in accordance with claim 13, wherein the amount of chromium ion in step (b), is sufficient to provide a unit cell containing from 1.2 to 4.2 chromium ions per cell, based on chemical analysis.

15. A pillared clay selected from the group consisting of smectites, flurohectorite and vermiculite, intercalated with chromium polyoxycations to provide a unit cell containing from 1.2 to 4.2 chromium ions per cell, and having a repeating spacing of at least 18 Angstroms.

16. A product in accordance with claim 14, wherein the repeating spacing is in a range of from 18 to 28 Angstroms.

17. A pillared clay product in accordance with claim 16, wherein the surface area of said product is at least 140 square meters per gram.

18. A product in accordance with claim 15, wherein said clay is a trioctahedral smectite having an average particle size of up to about 500 Angstroms and a generally lath-shaped morphology; and which is substantially completely delaminated.

* * * * *